United States Patent [19]

Farrar et al.

[11] 3,855,189

[45] Dec. 17, 1974

[54] POLAR COMPOUNDS IMPROVE EFFECTIVENESS OF POLYVINYL AROMATIC COMPOUNDS

[75] Inventors: Ralph C. Farrar; Alvin C. Rothlisberger, both of Bartlesville, Okla.

[73] Assignee: Phillips Petroleum Company, Bartlesville, Okla.

[22] Filed: Feb. 11, 1972

[21] Appl. No.: 225,622

[52] U.S. Cl. ...... 260/85.1, 260/94.7 A, 260/94.7 N, 260/93.5 A
[51] Int. Cl. .......................... C08d 5/02, C08d 5/04
[58] Field of Search ......... 260/94.7 A, 94.7 N, 85.1, 260/880 B, 879

[56] References Cited
UNITED STATES PATENTS

| | | |
|---|---|---|
| 2,975,160 | 3/1961 | Zelinski ........................... 260/83.5 |
| 3,078,254 | 2/1963 | Zelinski et al. ............. 260/94.7 A X |
| 3,097,193 | 7/1963 | Gruver ...................... 260/94.7 A X |
| 3,135,716 | 6/1964 | Uraneck et al. ........................ 45.5 |
| 3,210,333 | 10/1965 | Strobel .......................... 260/85.1 X |
| 3,280,084 | 10/1966 | Zelinski et al. ............. 260/880 B X |
| 3,468,972 | 10/1969 | Hsieh ................................. 260/836 |
| 3,595,941 | 7/1971 | Farrar et al. .................. 260/85.1 X |
| 3,637,554 | 1/1972 | Childers ...................... 260/880 B X |
| 3,668,279 | 6/1972 | Loveless ...................... 260/880 B X |

Primary Examiner—Joseph L. Schofer
Assistant Examiner—William F. Hamrock

[57] ABSTRACT

Polar compounds, added after polymerization is essentially complete to polymerization systems initiated with lithium based initiators, significantly improve the effectiveness of polyvinyl aromatic compounds in reducing cold flow and improving other polymer properties.

11 Claims, No Drawings

POLAR COMPOUNDS IMPROVE EFFECTIVENESS OF POLYVINYL AROMATIC COMPOUNDS

BACKGROUND OF THE INVENTION

This invention relates to polymerization processes employing organolithium initiator systems. In another aspect, the invention relates to improving the effectiveness of polyvinyl aromatic compounds.

Polyvinyl aromatic compounds have been used to treat polymerization systems initiated with organolithium initiators to produce coupled or branched polymers. Certainly, improved effectiveness of polyvinyl aromatic compounds would be desirable.

Accordingly, it is an object of our invention to improve the effectiveness of polyvinyl aromatic compounds. Another object of our invention is to provide improved polymers of polymerizable conjugated dienes, and/or monovinyl-substituted aromatic compounds.

SUMMARY OF THE INVENTION

Surprisingly, the addition of a polar compound after the monomers have been polymerized in an organolithium initiated polymerization system significantly improves and enhances the effectiveness of polyvinyl including poly(1-alkylvinyl) aromatic compounds in treating the polymerization reactions, significantly increasing efficiency of coupling and degree of branching.

By adding a polar compound to the polymer-lithium moiety in such a polymerization system, the then added polyvinyl terminating agent significantly reduces cold flow in rubbery polymers, provides a greater "Mooney-jump" effect in the preparation of coupled polymers, and provides branched polymers having lower solution viscosity as well as branched block copolymers of high green tensile strength.

DETAILED DESCRIPTION OF THE INVENTION

Polymerization systems to which our invention is applicable are those organolithium initiated polymerization systems which result in a polymer containing one or more active lithium-moieties after polymerization of the polymerizable monomers is substantially complete. To such a polymerization system, we add a polar compound which can be an ether, thioether, tertiary amine, triazine, one or more thereof, or a mixture of two or more of any thereof. The amount of such polar compound employed is that minor amount which effectively enhances the ability of the then added polyvinyl aromatic compound to couple or branch the polymer.

Specifically, prior to termination of the polymerization reaction system, prior to any quenching treatment which would tend to inactivate or destroy the active lithium-moieties, we add one or more polar compounds in minor effective amount. Coincidentally upon addition of the polar compound, or preferably thereafter, we add to the system a polyvinyl aromatic compound. The term polyvinyl, as we employ it herein, includes poly(1-alkylvinyl). After the desired degree of increase in Mooney value, or other desired effects, the reaction mixture is treated for conventional recovery of the coupled or branched polymers so produced.

MONOMERS

Monomers useful in preparing polymers which can be treated according to our invention include any of the polymerizable conjugated dienes, polymerizable monovinyl-substituted aromatic compounds, or any two or more of any thereof, polymerized in admixture, or by sequential addition of monomers, in any process in which such monomers can be polymerized by organolithium initiators by means known to the art. Such polymerization processes can be utilized to produce homopolymers of conjugated dienes, copolymers of two or more conjugated dienes, homopolymers of monovinyl-substituted aromatic compounds, copolymers of two or more monovinyl-substituted aromatic compounds, and/or copolymers of one or more conjugated dienes with one or more monovinyl-substituted aromatic hydrocarbon compounds.

In such polymerization systems, the conjugated dienes employed typically contain from 4 to 12 carbon atoms per molecule, and the monovinylsubstituted aromatic hydrocarbons from 8 to 20 carbon atoms per molecule. Exemplary monomers include 1,3-butadiene, isoprene, piperylene, 2,3-dimethyl-1,3-butadiene, 1,3-octadiene, 4,5-diethyl-1,3-octadiene, styrene, 1-vinylnaphthalene, 3-methylstyrene, 4-cyclohexylstyrene, 4-dodecylstyrene, 4-(4-phenyl-n-butyl)styrene, and the like. Examples of presently preferred polymers include polybutadiene, and rubbery butadiene/styrene copolymers of low vinyl unsaturation content.

POLYMER PREPARATION

Low vinyl copolymers of conjugated dienes and monovinyl-substituted aromatic compounds can be prepared according to the methods described in U.S. Pat. No. 3,294,768 issued Dec. 27, 1966, to Clinton F. Wofford. For example, potassium salts of alcohols or phenols such as ethyl alcohol, tert-butyl alcohol, tert-amyl alcohol, cyclohexyl alcohol, phenol, resorcinol, and the like can be employed to randomize the copolymerization of conjugated dienes and monovinyl-substituted aromatic compounds in hydrocarbon diluents with organolithium initiators.

The polymers can be prepared by these and other means well known to the art, using polymerization processes employing any of the organolithium initiators in general, under conditions known to the art, since the polymerization conditions themselves are not a part of our invention. Hence, the information provided is for exemplary purposes only.

ORGANOLITHIUM INITIATORS

Among the organolithium initiators that can be utilized are the known hydrocarbyllithium initiators represented by the general formula $R(Li)_x$ wherein x is an integer of 1 up to about 4. The R groups represent hydrocarbyl radicals which can be aliphatic including cycloaliphatic, or aromatic, or any combination thereof such as alkaryl or aralkyl. The size of the R group as to number of carbons is not limited by operability, but is chosen only as a matter of convenience, generally being up to about 20 carbon atoms per R groups. Examples of such initiators include methyllithium, n-butyllithium, cyclohexyllithium, 1,4-dilithiobutane, 1,4-dilithio-2-methyl-2-butene, 1,5-dilithionaphthalene, 1,3,5,8-tetralithionaphthalene, isopropyllithium, phenyllithium, and the like.

Other suitable initiators include the reaction products of lithium with polyaryl-substituted ethylenes, e.g., stilbene, 1,2-dilithio-1,2-diphenylethane, or with condensed ring aromatic compounds, e.g., 1-methylnaphthalene. Also suitable are the multilithium initiators prepared by the reaction of organomonolithium compounds with polyvinyl aromatic hydrocarbons and the like. These all are known to the art and need not be repetitiously detailed to one skilled in the art. Suitable exemplary lithium-based initiators are described in various patents, including U.S. Pat. No. 3,287,333, issued Nov. 22, 1966, to Robert P. Zelinski, and U.S. Pat. No. 3,296,150, issued Jan. 3, 1967, to Gerald R. Kahle.

POLYMERIZATION

Polymerization process conditions known to the art can be employed. Typical conditions include polymerization temperatures of from about −80° to 150° C., under any pressure desired or convenient, usually that sufficient to maintain monomers in substantially liquid phase, operating under autogenous pressure if desired. Polymerization can be conducted in the presence of a diluent, and the diluent of choice may influence or govern the pressure employed. The polymerization diluent preferably is one that is inert under conditions of the process. Useful diluents include paraffins including cycloparaffins, or aromatic hydrocarbons, or combinations or mixtures thereof including benzene, toluene, the xylenes, other alkyl benzenes, the butanes, octanes, decanes, cyclohexanes, cyclopentanes, and the like.

Typically, the organolithium initiators are employed in amount sufficient to provide from about 0.02 to 10 gram equivalents of lithium contained in the organolithium compound per 100 grams of monomer charged to the polymerization system. Polymerization is conducted for from a few minutes to several hours, such as 12 to 18 hours, or as necessary, under the conditions chosen, to effect substantially complete polymerization of monomer feed charged to the system, all as is well known in the art.

POLAR COMPOUNDS

When the desired degree of polymerization of the monomer charge is obtained, preferably when polymerization of monomers is substantially complete, one or more polar compounds thereupon are added to the polymerization reaction system. The amount of such polar compound used is that amount sufficient to provide the enhanced effectiveness in the addition of polyvinyl aromatic compound. These polar organic compounds can be ethers, thioethers, tertiary amines, or triazines. Mixtures of these polar compounds can be employed.

The amount of polar compound so employed broadly can be within a range of 0.001 to 5, preferably 0.05 to 2 as a balance between effectiveness and cost, parts by weight of polar compound per 100 parts by weight of monomer charge employed in the polymerization process itself.

Among the useful polar compounds are such as dimethyl ether, diethyl ether, anisole, tetramethylene oxide or tetrahydrofuran, 1,2-dimethoxyethane, dioxane, di-n-butyl sulfide, methylethyl sulfide, tri-n-butylamine, trimethylamine, N,N-dimethylaniline, pyridine, quinoline, and the like.

The triazines can be represented by the following general formula:

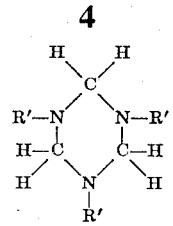

in which R' is a hydrocarbyl radical and can be alkyl including cycloalkyl, alkenyl including cycloalkenyl, aryl, as well as combinations thereof. Each such R' group can contain up to about 12 carbon atoms. Examples of suitable triazines include:

hexahydro-1,3,5-trimethyl-s-triazine
hexahydro-1,3,5-tri-n-octyl-s-triazine
hexahydro-1,3,5-tri-n-diodecyl-s-triazine
hexahydro-1,3,5-triallyl-s-triazine
hexahydro-1,3,5-triphenyl-s-triazine
hexahydro-1,3,5-tri(2-naphthyl)-s-triazine
hexahydro-1,3,5-tricyclohexyl-s-triazine
hexahydro-1,3,5-di-n-propylcyclopentyl)-s-triazine
hexahydro-1,3,5-tribenzyl-s-triazine and the like.

The polar compound or compounds which we employ to improve the effectiveness of polyvinyl aromatic compound in reducing cold flow and improving other polymer properties can be added to the polymerization system either as such, or admixed in a diluent such as one of the hydrocarbon diluents described for the polymerization system, or admixed with the polyvinyl aromatic compound, and can be added either prior to addition of the polyvinyl aromatic compound or simultaneously with but separately therefrom, or admixed therewith.

However, preferably, and to obtain maximum effectiveness and benefits from the polar compound additive in improving the effectiveness of the polyvinyl aromatic compound for polymer branching or coupling, we add the polar compound prior to addition of the polyvinyl aromatic compound, rather than along with or simultaneously with but separately. We believe that maximum effectivness in the over-all coupling or branching reaction with the polyvinyl aromatic compound is obtainable when the polar compound is added prior to addition of the polyvinyl aromatic compound. The preference is dictated by reaction efficiencies and maximum effectiveness of the thus subsequently added polyvinyl aromatic compound. Not only do we obtain improved branching in this manner, but also obtain added benefits in reduced polymerization reaction mixture viscosities by adding the polar compound and then adding the coupling or branching agent.

The manner of addition of the polar compound should be in such manner or by such method as to obtain generally homogeneous mixing throughout the unterminated polymerization mixture itself. Otherwise, the conditions or methods of addition of the polar compound additive are not believed to be critical.

The polar compound additive can be added at any convenient temperature and/or pressure, such as those at which the polymerization system then exists or is being operated. Of course, when the polymerization reaction is conducted in a polymerization diluent, the polymerization diluent ultimately is separated after the termination or branching step. Therefore, it is preferred that the polar compound employed have a boiling point sufficiently above that of the polymerization diluent as to minimize recycling of polar compound with the polymerization diluent, which generally necessitates, accordingly, separation of the two components prior to reuse or recycle of the polymerization diluent. As is known in the art, the use of a polar compound in the polymerization mixture or reaction itself may or may not be desirable depending upon the type of polymer desired.

POLYVINYL AROMATIC COMPOUND

Subsequent to treatment of the polymerization reaction system with the polar compound, the system then is treated with a polyvinyl or poly(1-alkylvinyl) compound, one or more. There does not presently appear any necessity to require any particular time of reaction for the polar compound, and hence the polyvinyl aromatic compound can be added coincidentally with the polar compound, or substantially immediately thereafter, or later as a matter of convenience, adding in whole or in part or in step-wise fashion, as may be desired.

Only a minor effective amount of polyvinyl aromatic compound is required. The amount of polyvinyl compound employed broadly will be from about 0.05 to 4, preferably from about 0.1 to 2, moles per gram equivalent of lithium in the polymer, i.e., the amount of lithium employed in the initiator. The time and temperature of such reactions as well known to the art in employing polyvinyl aromatic compounds for coupling and branching reactions. Useful temperatures have been found, for example, to be from about 40° F to 300° F., and conveniently at a temperature similar to that utilized for polymerization. Time of reaction can be as desired or convenient, over a broad range from a very few minutes to many hours. Reaction rates vary to some extent depending on the type and amount of polyvinyl aromatic compound to be charged, with larger amounts generally reducing time for reaction, as is known in the art.

Suitable polyvinyl aromatic compounds can be represented by one or more of the following general formulas:

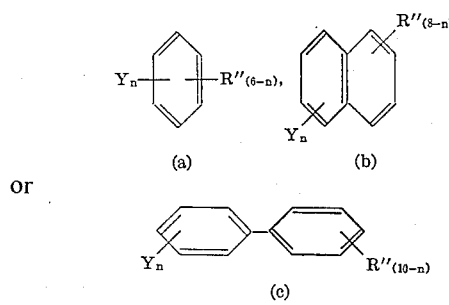

wherein Y can be represented by

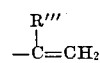

wherein $R'''$ is hydrogen or an alkyl radical having from 1 to about 6 carbon atoms. It is usually preferred that $R'''$ be hydrogen, and hence Y, therefore, represents a vinyl group. In the formulas above, each $R''$ is hydrogen or a lower alkyl of 1 to 4 carbon atoms with the total of the alkyl substituents containing not more than 12 carbon atoms, and n is an integer and is 2 or 3. The substituents in the above formulas (b) and (c) can be on either or both rings. Examples of appropriate polyvinyl aromatic compounds include divinylbenzene, 1,2,4-trivinylbenzene, 1,3-divinylnapthalene, 1,8-divinylnaphthalene, 1,3,5-trivinylnaphthalene, 2,4-divinylbiphenyl, 3,5,4'-trivinylbiphenyl, 1,2-divinyl-3,4-dimethylbenzene, 1,5,6-trivinyl-3,7-diethylnaphthalene, 1,3-divinyl-4,5,8-tributylnaphthalene, 2,2'-divinyl-4-ethyl-4'-propylbiphenyl, diisopropenylbenzene in its several isomeric forms, 1,3-di(1-hexylvinyl)-naphthalene, and the like. The divinyl aromatic hydrocarbons containing up to 26 carbon atoms presently are preferred for availability, cost, and reactivity, particularly divinylbenzene as either the ortho, meta, or para isomer. Commercial divinylbenzene, which is a mixture of isomers, is quite satisfactory.

EXAMPLES

The following examples are intended to be illustrative of our invention and therefore should not be considered restrictive or confining.

EXAMPLE I

A series of runs was made to demonstrate effectiveness of our polar compound additive in enhancing effectiveness of the addition of a polyvinyl aromatic compound coupling agent. The polymerization recipe, procedures, results, are set forth below:

Polymerization Recipe

|  | Parts, by wt. |
| --- | --- |
| Cyclohexane | 870 |
| 1,3-Butadiene | 75 |
| Styrene | 25 |
| Potassium t-amyloxide (KTA) | var. |
| n-Butyllithium (n-BuLi) | var. |
| Tetrahydrofuran (THF) | var. |
| Temperature, °C | 70 |
| Time, minutes | 110 |

Cyclohexane was charged followed by nitrogen purge. The monomers, styrene and butadiene, next were charged. THF 1.5 phm added to Run 7. Each reaction mixture then was preheated to 50° C. and KTA added to each mixture except Run 7. The initiator, n-Butyllithium, then was added and the polymerizations allowed to proceed at 70° C. for times as indicated. Viscosities of the reaction mixtures were determined as the time in seconds required for a 6 mm diameter glass ball to fall through each reaction mixture a measured distance. After 110 minutes of total reaction time, each mixture was terminated by the addition of a 10 weight per cent solution of a known conventional antioxidant 2,6-di-tert-butyl-4-methylphenol in a 50:50 by volume mixture of isopropyl alcohol-cyclohexane sufficient to provide about 1 part by weight of the antioxidant per 100 parts by weight of polymer. Each terminated mixture was coagulated in isopropyl alcohol and the polymer separated and dried under vacuum. The results of these runs are shown in Table I.

Table I

| Run No. | n-BuLi mhm | KTA phm | THF phm | Viscosity sec. at 30–40 min. | THF, phm at 45 min. | Ball Visc., sec. at 50 min. |
|---|---|---|---|---|---|---|
| 1 | 0.94 | 0.07 | — | 31.0 | — | 36 |
| 2 | 0.94 | 0.07 | — | 30.5 | 1.5 | 14.5 |
| 3 | 0.94 | 0.07 | — | 35 | — | 29 |
| 4 | 1.08 | 0.085 | — | 21.5 | — | 20 |
| 5 | 1.08 | 0.085 | — | 21.5 | 1.5 | 9 |
| 6 | 1.08 | 0.085 | — | 20 | — | 18.5 |
| 7 | 0.86 | — | 1.5 | — | — | — |

| Run No. | Coupling agent[a], phm at 60 min. | Ball Visc., sec. at 100 min. | Ball Visc., sec. after termination | Polymer Properties Inherent Viscosity | Polymer Properties Mooney Visc. ML-4 at 212° F. |
|---|---|---|---|---|---|
| 1 | 0.06 | 36 | 12.5 | 2.17 | 72 |
| 2 | 0.06 | 33 | 18.0 | 2.54 | 121 |
| 3 | — | 25 | 4.1 | 1.56 | 38 |
| 4 | 0.10 | 23 | 9.2 | 2.14 | 72 |
| 5 | 0.10 | 30 | 19.6 | 2.64 | 123 |
| 6 | — | 13 | 2.4 | 1.31 | 16 |
| 7 | — | 11.7 | 6.1 | 1.77 | 74 |

[a] Coupling agent was divinyl benzene.

The addition of a polar compound, after polymerization is substantially complete, to Runs 3 and 6 decreases the reaction mixture viscosity prior to addition of the polyvinyl aromatic compound. However, the data above for Runs 2 and 5 clearly reflect that the reduction in reaction mixture viscosity does not alone account for the demonstrated improved efficiency in coupling as exhibited by the Mooney values obtainable by the process of our invention.

Compare the Δ-Mooney values within each series of Runs 1 to 3 and 4 to 6. The Δ-ΔMooney values then can be compared with changes in reaction mixture viscosities. For example, the Δ-Mooney between Runs 1 and 3 (Δ1,3) = 34 and the Δ-Mooney between Runs 4 and 6 (Δ4,6) = 56 so that the Δ-Δ Mooney value for this set is 22 Mooney points. Postulating that the reduction in reaction mixture viscosity at 50 minutes for 36 seconds (Run 1) to 20 seconds (Run 4) is entirely responsible for the Δ-ΔMooney value of 22, then a theoretical expected ΔMooney value for Runs 1 and 2, i.e., (Δ1,2) can be calculated by $22 \times 21.5/36 \times 36/16 = 30$. However, the actual ΔMooney value found was 49. The considerable increase can only be attributable to the process of our invention.

A similar calculation applied to Runs 4 and 5 (Δ4,5) would be $22 \times 11/20 \times 36/16 = 27$ anticipated Mooney value. Again, the actual value obtained was 51.

The Δ-ΔMooney value between from Runs 2 and 3 (Δ2,3) and Runs 5 and 6 (Δ5,6), would be 24. Then, the anticipated Δvalue from Runs 1 and 2 (Δ1,2) would be obtained by $24 \times 21.5/36 \times 14.5/5.5 = 38$. The actual Δ value obtained was 49, sharply higher. Similarly, the calculated or expected Δvalue from Runs 4 and 5 (Δ4,5) would be obtained by $24 \times 11/20 \times 14.5/5.5 = 35$. Yet, the actual Δvalue found was 51. The conclusion is that only between 53 and 77 per cent of the actual Mooney jump obtained with a polyvinyl aromatic compound when a polar compound has been added according to our invention can be attributed merely to a decrease in reaction mixture viscosity.

The rubbery copolymers produced in accordance with the invention which contain a major amount of polymerized conjugated diene are vulcanizable polymeric materials which, after cross-linking, possess the properties normally associated with vulcanized rubber. The rubbery copolymers can be compounded by any of the known methods such as has been used in the past for compounding natural rubber. Vulcanization accelerators, reinforcing agents, fillers, oils, and the like, all can be employed. The polymers are useful for a variety of purposes including the manufacture of automobile tires, gaskets, wire coating, tubing, shoe soles, and the like.

Reasonable variations and modifications are possible within the scope of the foregoing disclosure and the appended claims to the invention.

We claim:

1. A polymerization process which comprises
   a. introducing into a polymerization zone at least one polymerizable monomer selected from the group consisting of polymerizable conjugated dienes, polymerizable monovinyl-substituted aromatic compounds, and mixtures, under polymerization conditions employing an organolithium initiator,
   b. polymerizing said polymerizable monomer with said organolithium initiator, thereby forming polymer-lithium moieties,
   c. treating the resulting polymerization mixture with at least one polar compound in minor amount effective to improve coupling of said polymer-lithium, wherein said polar organic compound is ether, thioether, tertiary amine, or triazine, or mixture,
   d. treating said polymerization reaction system with at least one polyvinyl aromatic compound in minor amount effective to couple said polymer-lithium moieties, wherein said polar compound is added to said polymerization mixture prior to or coincidentally with said polyvinyl aromatic compound.

2. The process according to claim 1 wherein said polymerizable conjugated diene contains 4 to 12 carbon atoms per molecule, and said polymerizable monovinyl-substituted aromatic hydrocarbon contains 8 to 20 carbon atoms per molecule, said organolithium initiator is employed in an amount sufficient to provide 0.02 to 2 equivalents of said lithium in said organolithium initiator per 100 parts by weight of monomer charged to the polymerization reaction system, said minor effective amount of said polar compound ranges from 0.001 to 5 parts by weight per 100 parts by weight of said monomer employed in said polymerization process, and said minor effective amount of said polyvinyl aromatic compound ranges from 0.005 to about 4 moles per gram equivalent of lithium used in said organolithium initiator.

3. The process according to claim 2 wherein said polyvinyl aromatic compound is represented by

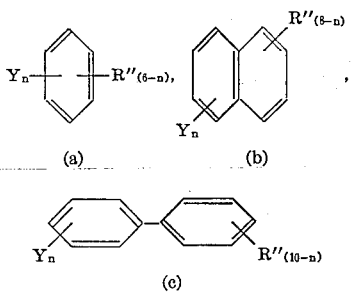

wherein Y is represented by

wherein R''' is hydrogen or is alkyl containing from 1 to 6 carbon atoms per alkyl group, each R'' is hydrogen or alkyl containing up to 4 carbon atoms such that the total of all alkyl groups is not more than 12 carbon atoms, and n is an integer and is 2 or 3, and said triazine polar compound is represented by

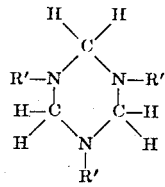

wherein each R' is a hydrocarbyl radical containing up to 12 carbon atoms per group.

4. The process according to claim 3 wherein said polar compound is added to said polymerization mixture after polymerization of said polymerizable monomer is substantially complete and prior to addition of said polyvinyl aromatic compound.

5. The process according to claim 4 wherein said polar compound is an ether.

6. The process according to claim 5 wherein said polymerizable conjugated diene is butadiene, and said polymerizable monovinyl substituted aromatic compound is styrene.

7. The process according to claim 6 wherein said ether is tetrahydrofuran.

8. The process according to claim 7 wherein said polyvinyl aromatic compound is divinylbenzene.

9. The process according to claim 8 wherein said organolithium initiator is n-butyllithium.

10. A polymerization process which comprises (a) copolymerizing a polymerizable conjugated diene and a polymerizable monovinyl-substituted aromatic compound, under polymerization conditions, in the presence of a randomizing amount of potassium tertiary-amyl oxide, employing an organomonolithium initiator, thereby forming polymer-lithium moieties, b. treating the resulting polymerization mixture from said step (a) with 0.001 to 5 parts by weight of tetrahydrofuran per 100 parts by weight of monomer, said tetrahydrofuran effective to improve coupling of said polymer lithium, c. thereafter treating the resulting polymerization reaction system from said step (b) with 0.05 to 4 moles of divinylbenzene per gram equivalent of lithium, effective to couple said polymer-lithium moieties, wherein said divinylbenzene is added sequentially after said addition of said tetrahydrofuran to said polymerization mixture.

11. The process of claim 2 wherein said polar compound is employed in a range of about 0.05 to 2 parts by weight per 100 parts by weight of monomer; and wherein said polyvinyl aromatic compound is employed in a range of about 0.1 to 2 moles per gram equivalent of lithium.

* * * * *